United States Patent
Wyma

(10) Patent No.: US 10,763,672 B2
(45) Date of Patent: Sep. 1, 2020

(54) IN AND RELATING TO LOAD BALANCING

(71) Applicant: Enatel Limited, Hamilton (NZ)

(72) Inventor: Murray Raymond Wyma, Christchurch (NZ)

(73) Assignee: Enatel Limited (NZ)

( * ) Notice: Subject to any disclaimer, the term of this patent is extended or adjusted under 35 U.S.C. 154(b) by 287 days.

(21) Appl. No.: 15/513,840

(22) PCT Filed: Sep. 25, 2015

(86) PCT No.: PCT/NZ2015/050164
§ 371 (c)(1),
(2) Date: Mar. 23, 2017

(87) PCT Pub. No.: WO2016/048173
PCT Pub. Date: Mar. 31, 2016

(65) Prior Publication Data
US 2017/0302079 A1    Oct. 19, 2017

(30) Foreign Application Priority Data
Sep. 25, 2014   (NZ) .................................. 700418

(51) Int. Cl.
*H02J 3/32* (2006.01)
*H02J 3/26* (2006.01)
*H02J 3/02* (2006.01)
*H02J 3/12* (2006.01)

(52) U.S. Cl.
CPC ...... *H02J 3/32* (2013.01); *H02J 3/02* (2013.01); *H02J 3/12* (2013.01); *H02J 3/26* (2013.01); Y02E 40/50 (2013.01)

(58) Field of Classification Search
CPC ........ H02J 3/32; H02J 3/02; H02J 3/12; H02J 3/26; Y02E 40/50
See application file for complete search history.

(56) References Cited

U.S. PATENT DOCUMENTS

| | | | | |
|---|---|---|---|---|
| 5,754,445 | A * | 5/1998 | Jouper | H02J 1/14 700/276 |
| 9,229,514 | B2 * | 1/2016 | Humphrey | G06F 1/28 |
| 9,796,278 | B2 * | 10/2017 | Zaki | H02J 3/26 |
| 9,865,410 | B2 * | 1/2018 | Mousavi | H01H 9/54 |
| 9,935,491 | B2 * | 4/2018 | Yang | H02J 3/26 |
| 9,997,916 | B2 * | 6/2018 | Fluman | H02J 3/381 |
| 2007/0081281 | A1 * | 4/2007 | Hamer | H02H 3/165 361/42 |

(Continued)

Primary Examiner — Daniel Kessie
(74) Attorney, Agent, or Firm — Greenberg Traurig, LLP

(57) ABSTRACT

A load balancing apparatus for balancing the current supplied on each phase of a multiple phase supply, Each supply phase feeds an AC load, as well as an AC-DC converter. The apparatus measures the current supplied from each phase of the supply as well as the power consumed by each of the AC loads. The power consumed by each of the AC-DC converters is adjusted so that the sum of the current drawn by any one of the AC loads, plus the current drawn by the AC-DC converter on the same supply phase, is substantially balanced between the supply phases. Typically the AC-DC converters supply a common DC battery. In some embodiments each AC load includes a DC-AC converter configured to supply power from the common DC battery to one or more of the AC loads.

6 Claims, 4 Drawing Sheets

(56) References Cited

U.S. PATENT DOCUMENTS

| | | | | |
|---|---|---|---|---|
| 2008/0197706 A1* | 8/2008 | Nielsen | ................. | H02J 1/102 |
| | | | | 307/66 |
| 2009/0244945 A1* | 10/2009 | Hatanaka | ............... | H02M 7/23 |
| | | | | 363/127 |
| 2011/0118894 A1 | 5/2011 | Reineccius et al. | | |
| 2012/0068540 A1* | 3/2012 | Luo | ......................... | H02J 3/32 |
| | | | | 307/48 |
| 2012/0175951 A1* | 7/2012 | Pamulaparthy | .......... | H02J 3/26 |
| | | | | 307/11 |
| 2013/0286697 A1* | 10/2013 | Eiland | ..................... | H02J 3/26 |
| | | | | 363/71 |
| 2014/0236369 A1 | 8/2014 | Kearns et al. | | |
| 2015/0084434 A1* | 3/2015 | Mousavi | ................. | H01H 9/54 |
| | | | | 307/116 |
| 2015/0365007 A1* | 12/2015 | Kaukojarvi | .............. | H02J 3/26 |
| | | | | 363/148 |

* cited by examiner

IN AND RELATING TO LOAD BALANCING

CROSS REFERENCE TO RELATED APPLICATIONS

This application is a national phase filing under 35 U.S.C. § 371 of International Application No. PCT/NZ2015/050164 filed Sep. 25, 2015, which claims priority from New Zealand application number 700418, filed Sep. 25, 2014, the entire contents of each are hereby incorporated by reference herein.

TECHNICAL FIELD

The present invention relates to improvements in and relating to load balancing. In particular the present invention relates to load balancing a 3-phase power supply.

BACKGROUND ART 3-phase AC mains supply is typically used for distributing generated power to end consumers. In a 3-phase system each AC supply is shifted by 120° ($2\pi/3$ radians) with respect to the other phases. One advantage of 3-phase power systems is the ease with which rotating machinery can generate the necessary phase shifted AC currents.

An important requirement when loading a 3-phase circuit is that each phase is loaded equally; in other words the loads on each of the 3 phases are roughly equivalent. When the loading on the phases are roughly equivalent the loading is said to be balanced. Because the phase currents are 120° out of phase the instantaneous sum of the currents for a balanced load is zero.

When the phase loading is balanced the system losses are reduced and lower rated conductors can be utilised. Unbalanced loads are also undesirable for generation. In a 3-phase generator the phase windings are typically distributed around the stator, spaced apart by 120° ($2\pi/3$ radians). When phase loads are unbalanced (phase currents varying more than 10%), rotor overheating may result in the generator. The rotor heating is caused by negative sequence currents in the field pole face.

Furthermore, when one of the phase windings is more heavily loaded than the others the stator experiences a greater resistance to its rotation when inducing current into the heavily loaded winding versus a less heavily loaded winding. The differing loading on the stator results in mechanical vibration, stress and accelerated wear and tear on the generator.

In addition to undesirable mechanical stresses an unbalanced load can cause problems with automatic voltage regulation (AVR) circuitry. An AVR circuit regulates the output voltage of the phases at a desired level, for example 110 $V_{AC}$ or 230 $V_{AC}$. When an unbalanced load is applied to a generator the AVR circuitry attempts to maintain the voltage on each phase at the desired level, however due to one phase being heavily loaded one phase may be disproportionally lower than the voltage on the other phases, this can result in instability of the AVR circuitry.

Unbalanced loads on a generator can cause load imbalance alarms and generator shut-down. Due to the issues caused by unbalanced loads utility power providers can charge penalties to consumers of 3-phase power who do not balance their demand across all phases.

Typically issues of unbalanced loads are avoided by consumers by ensuring that the loading on each phase is equal, usually by installing phase balancing circuitry. However typical phase balancing circuitry is extremely expensive. Traditional phase balancing circuitry is not well suited to rapidly changing loads, such as when loads are spasmodic, or unpredictable. Examples of such loads include automated compressors or pumps such as would be found in air-conditioning and refrigeration equipment.

Traditional phase load balancing systems utilise equipment that automatically switches AC loads from phase to phase to try to attain a balanced load. This generally involves switching equipment off momentarily as it transfers to a different phase, and the load steps are limited by the actual loads attached, and as such the balancing may be relatively coarse.

The most common technique for balancing loads is to simply distribute single-phase loads evenly across phases at the time of design. This does not however address the problem of single phase loads turning on and off.

It would be useful for a system to exist in which the individual loading can be varied dynamically to adjust for spasmodic or unpredictable loading.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

The present invention relates to a load balancing system for balancing the current supplied on each phase of a multiple phase supply. The system includes an AC-DC converter on each phase, wherein the current drawn by each AC-DC converter can be varied, thereby providing a controllably variable current draw on each phase.

The load balancing system measures the current consumed from each phase of the multiple phase supply, monitors the power consumed by AC-DC converters, and adjusts the output current supplied by each of the AC-DC converters. For each phase, the phase current is equal to the sum of the current drawn by any AC fed equipment on that phase, plus the current drawn by the AC-DC converter on that phase. Adjustment of the AC-DC converters across all of the phases allows the phase currents to be adjusted to be substantially the same.

According to one aspect of the present invention there is provided a load balancing apparatus for providing a substantially balanced load on a 3-phase power supply, the apparatus including:

a first AC input having an associated first input load sensing circuit, the first AC input having a current path to a first AC output and a first AC-DC converter feeding a first DC output;

a second AC input having an associated second input load sensing circuit, the second AC input having a current path to a second AC output and a second AC-DC converter feeding a second DC output;

a third AC input having an associated third input load sensing circuit, the third AC input having a current path to a third AC output and a third AC-DC converter feeding a third DC output; and a control circuit, wherein the control circuit is configured to dynamically adjust the power output from one or more of the first AC-DC converter, the second AC-DC converter and the third AC-DC converter to provide a balanced load on each of the first AC input, the second AC input and the third AC input.

In preferred embodiments the first AC-DC converter, second AC-DC converter and third AC-DC converter are configured to provide a variable DC output voltage.

In preferred embodiments at least two of the first AC-DC converter, the second AC-DC converter and the third AC-DC converter feed a common DC bus.

Preferably the common DC bus supplies a battery bank.

Preferably the control circuit dynamically varies the DC output voltage of one or more of the first AC-DC converter, the second AC-DC converter and/or the third AC-DC converter to vary the distribution of the load current supplied by from one or more of the AC-DC converters through the DC bus to the battery bank.

According to a second aspect of the present invention there is provided a system for providing a substantially balanced load on a 3-phase power supply, the system including:

at least one AC load;
at least one DC load;
a load balancing apparatus having a first AC input electrically connected to a first phase of the 3-phase power supply and having an associated first input load sensing circuit, the first AC input having a current path to a first AC output and a first AC-DC converter feeding a first DC output; a second AC input having an associated second input load sensing circuit, the second AC input having a current path to a second AC output and a second AC-DC converter feeding a second DC output; a third AC input having an associated third input load sensing circuit, the third AC input having a current path to a third AC output and a third AC-DC converter feeding a third DC output; and a control circuit, wherein the, or each, of the at least one AC load(s) is electrically connected to one or more of the first AC output, the second AC output, or the third AC output, wherein the at least one DC load is electrically connected to two or more of the first DC output, the second DC output and the third DC output, and wherein the control circuit is configured to dynamically adjust the current supplied from each of the DC outputs to the DC load so that the sum of the AC and DC loading on each AC input is substantially equal in magnitude.

According to a third aspect of the present invention there is provided a method for balancing a 3-phase load using a phase balancing system, the phase balancing system including a first AC input having an associated first input load sensing circuit, the first AC input having a current path to a first AC output and a first DC output, a second AC input having an associated second input load sensing circuit, the second AC input having a current path to a second AC output and a second DC output, a third AC input having an associated third input load sensing circuit, the third AC input having a current path to a third AC output and a third DC output and a control circuit, the method including the steps of:

a) inputting current from one of each phase of a 3-phase power supply to one each of the first AC input, the second AC input and the third AC input b) supplying from the first AC input one, or both of, the first AC output and the first DC output c) supplying from the second AC input one, or both of, the second AC output and the second DC output d) supplying from the third AC input one, or both of, the third AC output and the third DC output e) monitoring the loading on the first AC input by way of the first load sensing circuit f) monitoring the loading on the second AC input by way of the second load sensing circuit g) monitoring the loading on the third AC input by way of the third load sensing circuit h) adjusting the current output from one or more of the first DC output, the second DC output and the third DC output wherein the step of adjusting the current output results in the current drawn through each of the first AC input, the second AC input and the third AC input being substantially equivalent in magnitude.

BRIEF DESCRIPTION OF THE DRAWINGS

Further aspects of the present invention will become apparent from the ensuing description which is given by way of example only and with reference to the accompanying drawings in which.

BEST MODES FOR CARRYING OUT THE INVENTION

Figure 1:
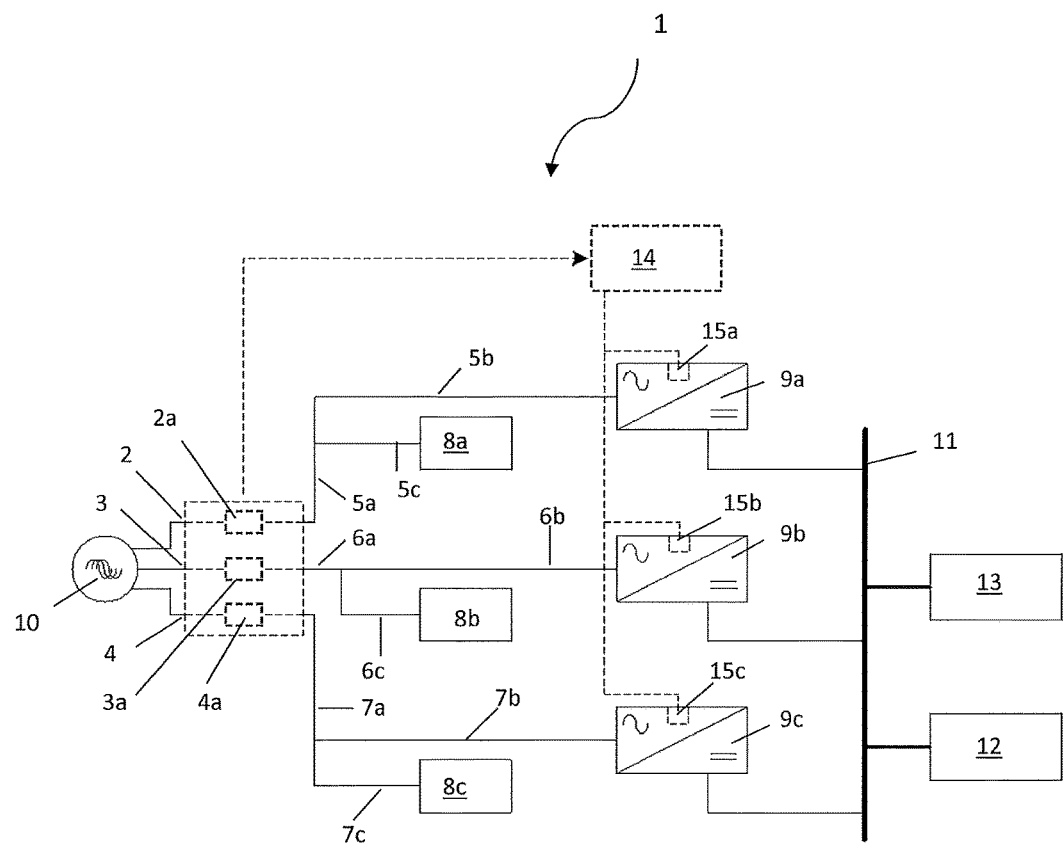
FIG. 1 shows a schematic view of a load balancing system in accordance with a preferred embodiment of the present invention.

With reference to FIG. 1 there is shown a schematic view of a load balancing system as generally indicated by designator 1. The load balancing system 1 includes a load balancing apparatus, as generally indicated by the components shown in dashed lines. The load balancing apparatus has a first AC input 2 having an associated first input load sensing circuit 2a, a second AC input 3 having an associated second input load sensing circuit 3a and a third AC input 4 having an associated third input load sensing circuit 4a. The AC inputs may take a number of forms, however they will typically feature either hardwired connection to a mains feed 10 or connection by way of one or more plug and socket connectors. Plug and socket style connectors will be more commonly used in embodiments where the mains feed 10 is provided by a temporary supply such as a generator.

Current paths 5a-c, 6a-c and 7a-c are provided from each of the AC inputs 2, 3, 4, through input load sensing circuits 2a, 3a, 4a to AC outputs 8a, 8b, 8c and to DC outputs 9a, 9b, 9c.

The current paths 5a-c, 6a-c and 7a-c may be provided by way of separate cables or circuit board traces or they may be shared in part, as is shown, where both AC load and DC load current flows in sections 5a, 6a and 7a, AC load current flows in sections 5c, 6c and 7c and DC load current flows in sections 5b, 6b and 7b.

Although shown as a single circuit block, AC loads 8a, 8b, 8c could take any number of forms. For example, each of blocks 8a, 8b, 8c may comprise a single AC powered piece of equipment or a number of separate pieces of equipment. AC loads 8a, 8b, 8c will generally include appliances and equipment that would typically be supplied from the AC mains feed and will also include the standard power outlets and light fittings if the load balancing system is installed in a building. The number of devices supplied by each phase may vary; however, fixed plant and outlets will typically be distributed evenly across each phase to provide a roughly balanced load on each phase under ideal load conditions.

The AC current paths 5b, 6b and 7b provide current to AC-DC converters 9a, 9b, 9c. The outputs of the AC-DC converters 9a, 9b, 9c each feed a DC bus 11. The DC bus voltage may vary and is not pertinent to the invention.

The DC bus 11 supplies current to a battery bank 12 and a DC load 13. The DC load 13 may vary depending on the type of installation and may include DC powered telecommunications equipment, server banks, lighting or the like. In some embodiments the DC load may include one or more inverters configured to provide AC power.

In some embodiments the AC-DC converters 9a, 9b and 9c may be capable of dual mode operation, whereby they can function as both a rectifier and an inverter. Alternatively separate rectifier and inverter modules may be provided in a parallel arrangement. Where an inverter function is provided current can be drawn from the DC bus and fed onto one or more of the AC phases. In such embodiments current can be drawn from the battery bank and one or more of the phases to be supplied to the other phases.

A control circuit 14 monitors the input load sensing circuits 2a, 3a, 4a and transmits control signals to control circuitry 15a, 15b, 15c one each of which is associated with one of the AC-DC converters 9a, 9b, 9c. Upon receiving a control signal transmitted by the control circuit 14 the control circuitry 15a, 15b, 15c acts to adjust the amount of current supplied by its associated AC-DC converter 9a, 9b, 9c onto the DC bus 11.

In some embodiments the control circuitry may control its associated AC/DC converter 9a, 9b, 9c to switch from a rectification mode to an inverter mode, whereby current is drawn from the DC bus and fed to the AC load sharing the same phase.

With reference now to FIGS. 1 to 4 the load balancing system 1 will be described by way of an example.

Figure 2A:
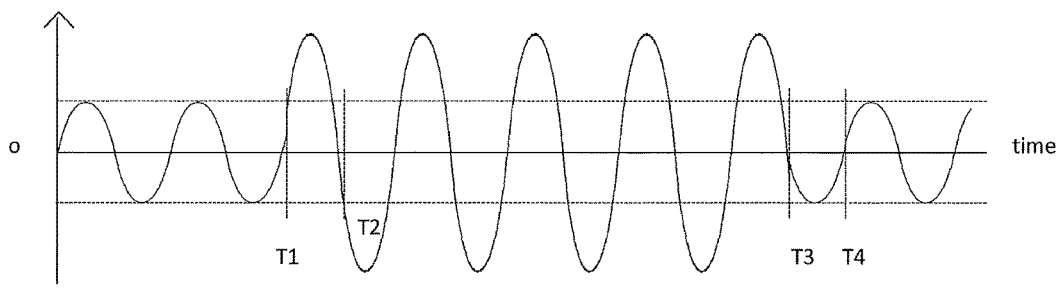
FIG. 2a shows a current vs time graph for an AC load supplied from a first phase.
Figure 2B:
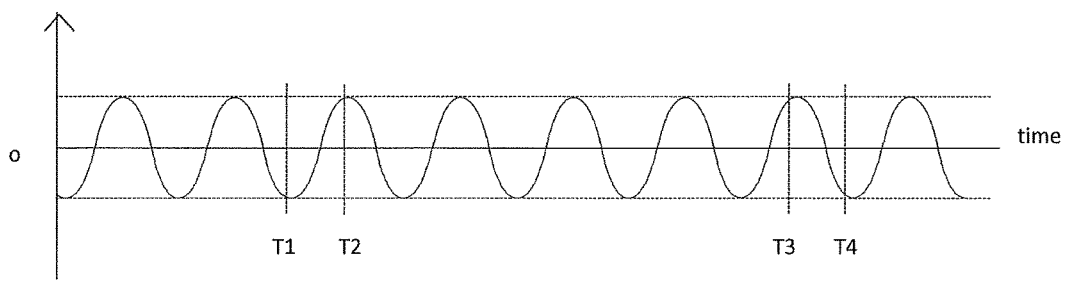
FIG. 2b shows a current vs time graph for an AC load supplied from a second phase.
Figure 2C:
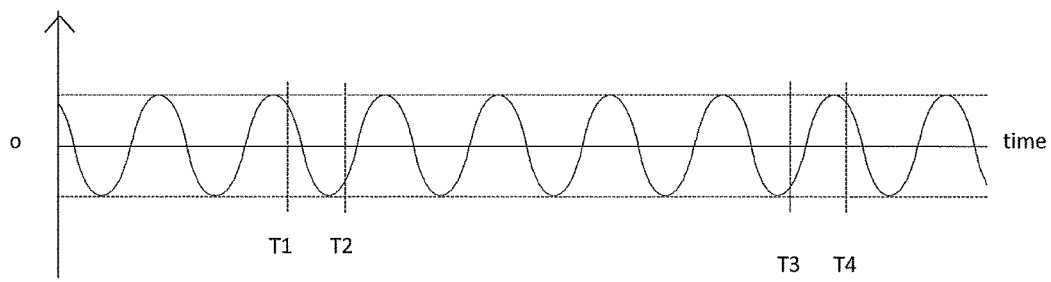
FIG. 2c shows a current vs time graph for an AC load supplied from a third phase.

FIGS. 2a-2c are current vs time graphs. FIG. 2a depicts the AC load current on phase 1 drawn by the AC load 8a. Phase 1 AC load 8a includes steady plant having a continuous fixed draw as well as an air-conditioning unit having a compressor which sporadically turns on. In FIG. 2a the compressor turns on at time $T_1$ and turns off at time $T_3$ as is indicated by the increased current consumption between the $T_1$ and $T_3$ points.

FIG. 2b is the AC load current on phase 2 drawn by AC load 8b and FIG. 2c is the AC load current on phase 3 drawn by AC load 8c. For the purposes of this example the AC load current on each of phase 2 and phase 3 is a continuous fixed draw, as is shown by the steady current draw in each of FIGS. 2b and 2c.

Figure 3A:
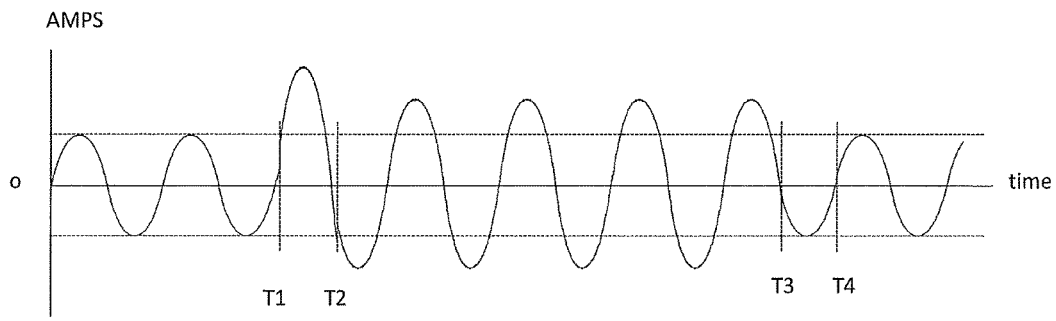
FIG. 3a shows a current vs time graph of the total current supplied to a first phase.
Figure 3B:
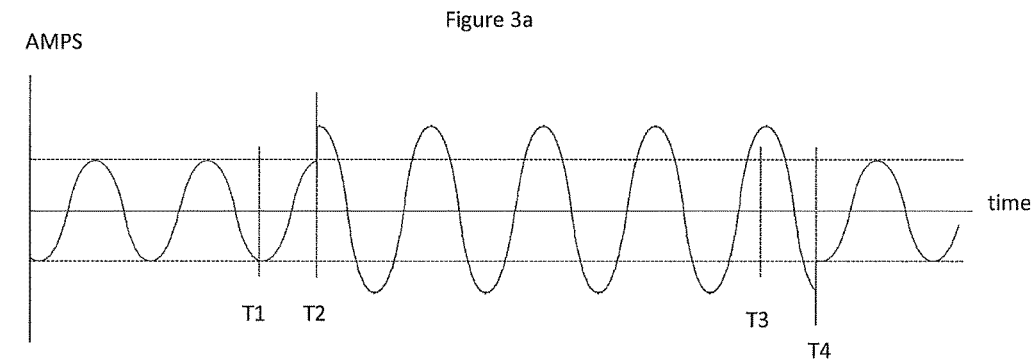
FIG. 3b shows a current vs time graph of the total current supplied to a second phase.
Figure 3C:
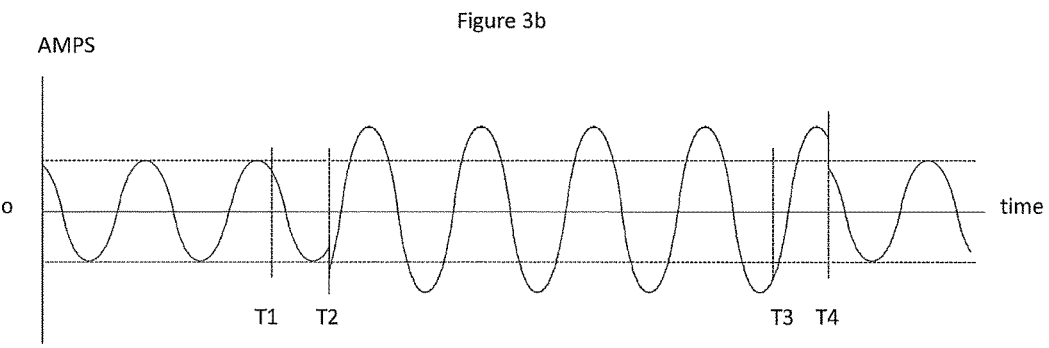
FIG. 3c shows a current vs time graph of the total current supplied to a third phase.

FIGS. 3a-3c are also current vs time graphs. FIG. 3a illustrates the current waveform measured at load sensing circuit 2a and is indicative of the combined current consumed by both the AC load 8a and the loading of the AC-DC converter 9a on phase 1. FIG. 3b illustrates the current waveform measured at load sensing circuit 3a and is indicative of the combined current consumed by both the AC load 8b and the loading of the AC-DC converter 9b on phase 2. FIG. 3c illustrates the current waveform measured at load sensing circuit 4a and is indicative of the combined current consumed by both the AC load 8c and the loading of the AC-DC converter 9c on phase 3.

Figure 4A:
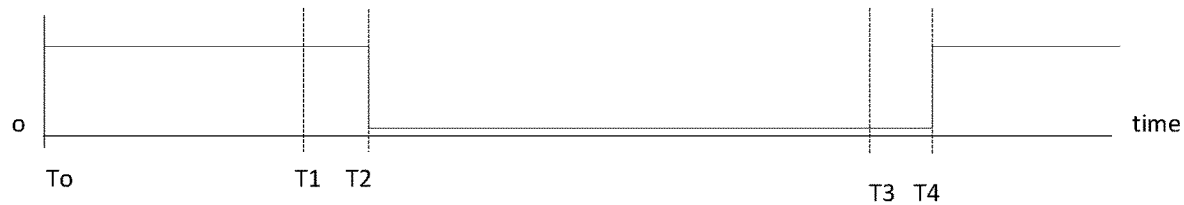
FIG. 4a shows a current vs time graph for a DC load supplied from a first phase.
Figure 4B:
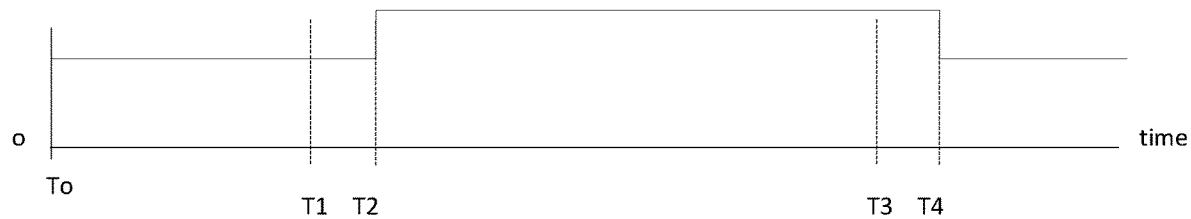
FIG. 4b shows a current vs time graph for a DC load supplied from a second phase.
Figure 4C:
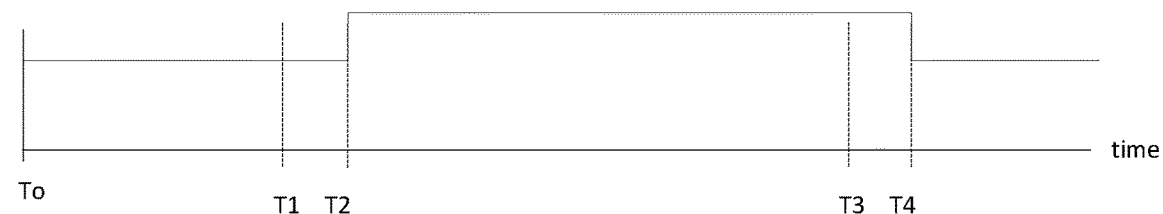
FIG. 4c shows a current vs time graph for a DC load supplied from a third phase.

FIGS. 4a-4c are DC current vs time graphs. FIG. 4a depicts the DC load current on phase 1, FIG. 4b depicts the DC load current on phase 2 and FIG. 4c depicts the DC load current on phase 3.

For the purposes of this example the AC-DC converters 9a, 9b and 9c each feed DC bus 11. The DC bus supplies current to a battery bank 12 and a DC load 13 which is in the form of fixed telecommunications equipment. For simplicity the current drawn by the fixed telecommunications equipment is constant and the current drawn by the battery bank is proportional to the DC bus voltage. The battery can be used as both a current sink where and a current source. For example, increasing the DC output voltage of the AC-DC converters to a voltage greater than the battery banks terminal voltage causes an increasing current to flow into the battery bank, and reducing the DC output voltage of the AC-DC converters to a voltage below the terminal voltage of the battery bank causes current to flow out of the battery bank.

The current supplied from each over the AC-DC converters is regulated by varying the DC output voltages.

The period of time between $T_1$ and $T_2$, and $T_3$ and $T_4$ correspond to the finite time taken for the control circuit 14 to detect a current imbalance between the phases, to transmit control signals to the control circuitry and for the AC-DC converters to adjust their outputs accordingly. It should be appreciated that this time period will vary between embodiments. The delay illustrated in FIGS. 2a-2c, 3a-3c and 4a-4c has been exaggerated to illustrate the operation of the present invention and is in no way indicative of the length of delay that will be present in preferred embodiments of the present invention.

The period between $T_1$-$T_2$ and $T_3$-$T_4$ is the period during which the phases are being balanced. In preferred embodiments the load balancing system dynamically balances the phases sufficiently fast for there to be substantially no period in which there are unbalanced phase currents. It should be appreciated that in practical realisations the times $T_1$-$T_2$ and $T_3$-$T_4$ may vary from a few seconds to a number of minutes.

The sequence of events detailed in the example shown in FIGS. 2a-2c, 3a-3c and 4a-4c commences with the system operating in a steady state, this is the period between $T_0$ and $T_1$. During the $T_0$ to $T_1$ period the AC and DC loads 8a, 8b, 8c on each phase are substantially balanced. It should be appreciated that the AC and DC currents shown in FIGS. 3a-c and 4a-c have been chosen to be the same solely for clarity, the actual AC load currents may vary between phases, in which case the DC load currents will also vary in order for the sum of the AC and DC currents to be same on each phase.

During the period between $T_1$ and $T_3$ the air-conditioning unit on phase 1 switches on and the AC load current increases, as is shown in FIG. 2a. The control circuit 14 detects the current through phase 1 input load sensing circuit 2a as being greater than the current though phase 2 and phase 3 input load sensing circuits 3a and 4a. The controller transmits control signals to:
- a) control circuitry 15a instructing phase 1 AC-DC converter 9a to reduce its supply of current to DC bus 11, the decreasing current occurs at $T_2$ in FIG. 4a;
- b) control circuitry 15b instructing phase 2 AC-DC converter 9b to increase its supply of current to DC bus 11, the increase in current occurs at $T_2$ in FIG. 4b; and
- c) control circuitry 15c instructing phase 3 AC-DC converter 9c to increase its supply of current to DC bus 11, the increase in current occurs at $T_2$ in FIG. 4c.

It should be appreciated that although FIGS. 4a, 4b and 4c illustrate ideal waveforms showing a step change in current, real world embodiments may exhibit a smoother transition such as ramping or the like.

In FIGS. 3a to 3c the period of time between $T_2$ and $T_3$ represents the period of time that the compressor is running on phase 1 and the load balancing system 1 is controlling the current supplied by the AC-DC converters 9a, 9b, 9c to balance the phase currents. During this period the sum of the AC and DC load currents on each phase are substantially the same. The control circuit 14 measures the current through the phase 1, phase 2 and phase 3 input load sensing circuits 2a, 3a and 4a as being substantially the same.

In FIG. 2a the current drops back to its steady state value at time $T_3$. This corresponds to the time when the compressor on phase 1 turns off.

During the period of time between $T_3$ and $T_4$ the control circuit 14 detects the current through phase 1 input load sensing circuit 2a as being less than the current though phase 2 and phase 3 input load sensing circuits 3a and 4a. The controller transmits control signals to:
- a) control circuitry 15a instructing phase 1 AC-DC converter 9a to increase its supply of current to DC bus 11, the increasing current occurs at $T_4$ in FIG. 4a;
- b) control circuitry 15b instructing phase 2 AC-DC converter 9b to decrease its supply of current to DC bus 11, the decrease in current occurs at $T_4$ in FIG. 4b; and
- c) control circuitry 15c instructing phase 3 AC-DC converter 9c to decrease its supply of current to DC bus 11, the decrease in current occurs at $T_4$ in FIG. 4c.

Typically the combination of the DC load and the maximum charging rate of the battery bank are configured to provide a peak rate at which current can be supplied by the AC-DC converters. This peak rate is configured to be substantially equivalent to, or greater than, the highest sporadic AC load that might draw current on one of the phases. In embodiments that provide an inverter function current can be drawn from phases that have a low AC load to supply current to phases that have a high AC load, thereby providing load sharing between phases.

The AC-DC converters 9a, 9b, 9c may be either single modules or multiple modules in parallel, or complete 3-phase modules that have the ability to control individual phase input currents. A modular system allows scalability to be provided to the system whereby additional modules can be added if larger phase imbalances need to be catered for. In some installations numerous individual load balancing system may be provided which are spread across a single site that is fed by a single 3-phase supply. In such embodiments the individual load balancing systems may monitor a single set of input load sensing circuits 2a, 3a, 4a associated with the single 3 phase supply, or alternatively each load balancing system may monitor its own set of input load sensing circuits 2a, 3a, 4a. If each load balancing system balances its own current demand on each phase the combined loading of the individual load balancing systems will also be balanced. In some embodiments the individual load balancing systems may be configured to communicate with one another to act in unison to equalise the phase loading in either a collaborative manner or as individuals.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention as claimed in the appended claims, and without diminishing its attendant advantages. It is therefore intended that such changes and modifications be included within the present invention.

What is claimed is:

1. A load balancing apparatus for providing a substantially balanced load on a 3-phase power supply, the apparatus comprising:
   a first AC input having an associated first input load sensing circuit, the first AC input configured to supply a first AC load and a first AC-DC converter configured to feed a first DC load;
   a second AC input having an associated second input load sensing circuit, the second AC input configured to supply a second AC load and a second AC-DC converter configured to feed a second DC load;
   a third AC input having an associated third input load sensing circuit, the third AC input configured to supply a third AC load and a third AC-DC converter configured to feed a third DC load; and
   a control circuit configured to monitor the first, second, and third input load sensing circuits and dynamically adjust the power output from one or more of the first AC-DC converter, the second AC-DC converter, or the third AC-DC converter based on the monitored load sensing circuits to provide a balanced load on each of the first AC input, the second AC input, and the third AC input, wherein the first AC-DC converter, second AC-DC converter, and third AC-DC converter are configured to provide a variable DC output voltage, wherein at least two of the first AC-DC converter, the second AC-DC converter, or the third AC-DC converter feed a common DC bus supplying a battery bank, and wherein the control circuit dynamically varies the DC output voltage of one or more of the first AC-DC converter, the second AC-DC converter, or the third AC-DC converter to vary the distribution of the load current supplied by one or more of the AC-DC converters through the common DC bus to the battery bank.

2. The load balancing apparatus as claimed in claim 1, wherein the first AC input is configured to electrically couple to a first phase of the 3-phase power supply, the second AC input is configured to electrically couple to a second phase of the 3-phase power supply, and the third AC input is configured to electrically couple to a third phase of the 3-phase power supply.

3. The load balancing apparatus as claimed in claim 1, wherein the apparatus is configured to be electrically connected between a 3-phase utility feed to a premises and at least a portion of the electrical load presented by that premises.

4. The load balancing apparatus as claimed in claim 1, wherein the apparatus is configured to be electrically connected between a 3-phase feed and a load comprising an AC component and a DC component.

5. The load balancing apparatus as claimed in claim 1, wherein the first input load sensing circuit, second input load sensing circuit, and third input load sensing circuit include current transformers coupled to the first AC input current path, the second AC input current path, and the third AC input current path respectively.

6. A system for providing a substantially balanced load on a 3-phase power supply, the system comprising:

at least one AC load;

at least one DC load;

a load balancing apparatus having a first AC input electrically connected to a first phase of the 3-phase power supply and having an associated first input load sensing circuit, the first AC input having a current path to a first AC output and a first AC-DC converter feeding a first DC output;

a second AC input having an associated second input load sensing circuit, the second AC input having a current path to a second AC output and a second AC-DC converter feeding a second DC output;

a third AC input having an associated third input load sensing circuit, the third AC input having a current path to a third AC output and a third AC-DC converter feeding a third DC output; and a control circuit, wherein the at least one AC load is electrically connected to one or more of the first AC output, the second AC output, or the third AC output, wherein the at least one DC load is electrically connected to two or more of the first DC output, the second DC output, or the third DC output, wherein the control circuit is configured to monitor the first, second, and third input load sensing circuits and dynamically adjust the current supplied from each of the DC outputs to the DC load based on the monitored load sensing circuits so that the sum of the AC and DC loading on each AC input is substantially equal in magnitude, and wherein at least two of the first AC-DC converter, the second AC-DC converter, or the third AC-DC converter feed a common DC bus supplying a battery bank, and wherein the control circuit dynamically varies the DC output voltage of one or more of the first AC-DC converter, the second AC-DC converter, or the third AC-DC converter to vary the distribution of the load current supplied by one or more of the AC-DC converters through the common DC bus to the battery bank.

* * * * *

UNITED STATES PATENT AND TRADEMARK OFFICE
CERTIFICATE OF CORRECTION

| | | |
|---|---|---|
| PATENT NO. | : 10,763,672 B2 | Page 1 of 1 |
| APPLICATION NO. | : 15/513840 | |
| DATED | : September 1, 2020 | |
| INVENTOR(S) | : Murray Raymond Wyma | |

It is certified that error appears in the above-identified patent and that said Letters Patent is hereby corrected as shown below:

On the Title Page

At Item (54) and in the Specification at Column 1, Line 1, the title should read as:
LOAD BALANCING Signed and Sealed this
Eleventh Day of May, 2021

Drew Hirshfeld
*Performing the Functions and Duties of the
Under Secretary of Commerce for Intellectual Property and
Director of the United States Patent and Trademark Office*